US010558480B2

(12) United States Patent
Dalal et al.

(10) Patent No.: US 10,558,480 B2
(45) Date of Patent: Feb. 11, 2020

(54) OPTIMIZING ACCESS TO PRODUCTION DATA

(71) Applicant: Veritas Technologies LLC, Mountain View, CA (US)

(72) Inventors: Chirag Dalal, Maharashtra (IN); Vaijayanti Rakshit Bharadwaj, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 564 days.

(21) Appl. No.: 14/850,072

(22) Filed: Sep. 10, 2015

(65) Prior Publication Data
US 2017/0075708 A1  Mar. 16, 2017

(51) Int. Cl.
*G06F 13/12* (2006.01)
*G06F 9/455* (2018.01)
*G06F 16/182* (2019.01)
*G06F 16/188* (2019.01)

(52) U.S. Cl.
CPC ...... *G06F 9/45533* (2013.01); *G06F 9/45558* (2013.01); *G06F 16/182* (2019.01); *G06F 16/188* (2019.01); *G06F 2009/45595* (2013.01)

(58) Field of Classification Search
CPC .............. G06F 11/36; G06F 11/3664; G06F 17/30194; G06F 17/30233; G06F 2009/45595; G06F 3/0604; G06F 3/065; G06F 3/067; G06F 9/45533; G06F 9/45558
See application file for complete search history.

(56) References Cited

U.S. PATENT DOCUMENTS

| 5,717,893 | A | 2/1998 | Mattson |
| 5,940,868 | A | 8/1999 | Wagner |
| 6,075,938 | A | 6/2000 | Bugnion et al. |
| 7,747,660 | B1 * | 6/2010 | Rajan ............... G06F 3/0608 707/821 |
| 8,290,911 | B1 | 10/2012 | Janakiraman |

(Continued)

FOREIGN PATENT DOCUMENTS

| WO | WO 2013/061376 | 5/2013 |
| WO | 2017004361 A1 | 1/2017 |

OTHER PUBLICATIONS

Dalal, et al.; India Application No. 2485/MUM/2015 filed Jun. 30, 2015.

(Continued)

*Primary Examiner* — Idriss N Alrobaye
*Assistant Examiner* — Richard B Franklin
(74) *Attorney, Agent, or Firm* — Campbell Stephenson LLP

(57) ABSTRACT

Various systems, methods, and processes for optimizing access to production data in application development and testing environments are disclosed. If an input/output (I/O) operation is a read operation, a storage location on a virtual storage unit at which the read operation is to be performed is determined. Also determined is whether an earlier write operation was performed at the storage location. If an earlier write operation was performed at the storage location, the read operation is performed on one or more virtual data files. However, if the earlier write operation was not performed at the storage location, the read operation is performed on allocated storage space.

21 Claims, 9 Drawing Sheets

(56) References Cited

U.S. PATENT DOCUMENTS

| | | | |
|---|---|---|---|
| 8,874,823 | B2 | 10/2014 | Joshi et al. |
| 8,938,425 | B1 | 1/2015 | Armangau |
| 9,021,087 | B1 | 4/2015 | Weng et al. |
| 9,043,555 | B1 | 5/2015 | Khona et al. |
| 9,280,373 | B1 | 3/2016 | Faught et al. |
| 9,317,320 | B2 | 4/2016 | Lee et al. |
| 9,342,253 | B1 | 5/2016 | Muthukkaruppan et al. |
| 9,495,251 | B2 | 11/2016 | Kottomtharayil et al. |
| 9,507,617 | B1 | 11/2016 | Wang et al. |
| 9,519,585 | B2 | 12/2016 | Magenheimer |
| 9,594,583 | B2 | 3/2017 | Bonzini |
| 9,697,130 | B2 | 7/2017 | Karippara et al. |
| 9,823,992 | B2 | 11/2017 | Chow et al. |
| 9,836,402 | B1 | 12/2017 | Riel |
| 9,880,744 | B1 | 1/2018 | Dalal et al. |
| 9,984,089 | B2 | 5/2018 | Liu et al. |
| 10,037,276 | B1 | 7/2018 | Dalal et al. |
| 2008/0320316 | A1 | 12/2008 | Waldspurger et al. |
| 2009/0260007 | A1 | 10/2009 | Beaty et al. |
| 2009/0320011 | A1 | 12/2009 | Chow et al. |
| 2010/0175064 | A1 | 7/2010 | Brahmaroutu |
| 2010/0235831 | A1 | 9/2010 | Dittmer |
| 2011/0246813 | A1 | 10/2011 | Collier et al. |
| 2011/0289501 | A1 | 11/2011 | Yamasaki et al. |
| 2012/0030456 | A1 | 2/2012 | Wu et al. |
| 2012/0304171 | A1 | 11/2012 | Joshi et al. |
| 2012/0317642 | A1 | 12/2012 | Royal et al. |
| 2013/0111474 | A1 | 5/2013 | Agarwal et al. |
| 2013/0132691 | A1 | 5/2013 | Banga et al. |
| 2013/0132967 | A1 | 5/2013 | Soundararajan et al. |
| 2013/0191924 | A1 | 7/2013 | Tedesco et al. |
| 2013/0198459 | A1 | 8/2013 | Joshi et al. |
| 2013/0262387 | A1 | 10/2013 | Varadharajan |
| 2013/0311595 | A1 | 11/2013 | Milatinovici et al. |
| 2014/0052892 | A1 | 2/2014 | Klein et al. |
| 2014/0059292 | A1 | 2/2014 | Phelan et al. |
| 2014/0068183 | A1 | 3/2014 | Joshi et al. |
| 2014/0123138 | A1 | 5/2014 | Lee et al. |
| 2014/0156601 | A1 | 6/2014 | Strunk et al. |
| 2014/0156910 | A1 | 6/2014 | Uttamchandani et al. |
| 2014/0223096 | A1 | 8/2014 | Yang et al. |
| 2014/0237471 | A1 | 8/2014 | Snider |
| 2014/0244898 | A1 | 8/2014 | Liu et al. |
| 2014/0344504 | A1 | 11/2014 | Luo et al. |
| 2014/0351810 | A1 | 11/2014 | Pratt et al. |
| 2014/0359229 | A1 | 12/2014 | Cota-Robles |
| 2015/0039717 | A1 | 2/2015 | Chiu et al. |
| 2015/0067262 | A1 | 3/2015 | Uttamchandani et al. |
| 2015/0135174 | A1 | 5/2015 | Bonzini et al. |
| 2015/0363219 | A1 | 12/2015 | Kasturi et al. |
| 2016/0127307 | A1 | 5/2016 | Jain et al. |
| 2017/0003999 | A1 | 1/2017 | Dalal et al. |
| 2017/0132027 | A1 | 5/2017 | Bharadwaj et al. |

OTHER PUBLICATIONS

Lu, Pin and Shen, Kai. "Virtual Machine Memory Access Tracing with Hypervisor Exclusive Cache," USENIX Association, 2007 USENIX Annual Technical Conference, Jun. 15, 2007, pp. 29-43.
PCT International Written Opinion and Search Report of the International Searching Authority for Application No. PCT/US2016/040367 dated Oct. 4, 2016, 13 pages.

* cited by examiner

1

OPTIMIZING ACCESS TO PRODUCTION DATA

FIELD OF THE DISCLOSURE

This disclosure relates to data storage. In particular, this disclosure relates to optimizing access to production data.

DESCRIPTION OF THE RELATED ART

Production data is information that is stored persistently and used by companies and/or organizations for business purposes. Production data is typically used to conduct application and development and testing. For example, virtual machines can be implemented in an application development and testing environment, and can be used to perform application development and testing using the production data.

To conduct application development and testing, a copy of the production data is required. In particular, because application development and testing can modify (or change) production data (e.g., during the course of application development and testing), a copy of the production data is required to ensure that the original copy of the production data remains un-tampered and pristine. However, because production data sets are typically very large in size, application development and testing environments make (and consume) large copies of production data.

Creating a copy of a large production data set takes a significant amount of time during which the production data is not instantly available to the application development and testing environment (e.g., to a virtual machine conducting such application development and testing). Moreover, because the changes (or modifications) made to this copy of production data are typically very small or minimal, a significant majority of the copy of the production data remains un-changed and/or un-modified, thus further rendering the provisioning of production data via copying redundant.

SUMMARY OF THE DISCLOSURE

Various systems, methods, and processes for optimizing access to production data in application development and testing environments are disclosed. One such method involves performing a write operation of a virtual data file in response to determining that an input/output (I/O) operation is a write operation. In this example, the virtual data file is stored in a virtual disk, the virtual disk is part of a virtual storage unit, and the virtual data file is part of an allocated storage space (on the virtual disk).

In some embodiments, in response to determining that the I/O operation is a read operation, the method determines a storage location on the virtual storage unit at which the read operation is to be performed, and determines whether an earlier write operation was performed at the storage location. In response to determining that the earlier write operation was performed at the storage location, the method performs the read operation on the virtual data file, and in response to determining that the earlier write operation was not performed at the storage location, the method performs the read operation on the allocated storage space.

In one embodiment, the method receives the I/O operation at a storage system. The storage system includes production data files, and the virtual storage unit. In this example, the virtual storage unit includes the virtual disk, and the allocated storage space. In another embodiment, the method determines whether the I/O operation is a read operation or a write operation. The I/O operation is generated by a virtual machine executing on a virtualization server, and the storage system is communicatively coupled to the virtualization server.

In some embodiments, the method receives an allocation map from the virtual machine at the storage system. In this example, the allocation map includes information regarding the allocated storage space. The allocated storage space is allocated by the virtual machine, and corresponds to the production data files stored on the storage system.

In certain embodiments, the method involves converting information in the allocation map to one or more offsets associated with the production data files. In this example, the one or more offsets are retrieved from a storage structure. The method then overlays the storage structure over the allocation map. The overlaying permits the storage system to re-map the I/O operation from the virtual machine directed to the allocated storage space on the virtual storage unit to the production data files on the storage system.

In other embodiments, the method includes receiving a request from the virtualization server to create the virtual storage unit, based on the receiving, creating the virtual storage unit in the storage system. The virtual storage unit is used by the virtual machine to allocate the allocated storage space.

In some embodiments, the method involves importing the virtual disk from the storage system to the virtualization server. The importing is performed by a client. In this example, the client is a Network File System client. The virtual disk is imported to a hypervisor executing on the virtualization server. In other embodiments, the method involves exporting the virtual disk from the hypervisor to the virtual machine, where the exporting is performed by the hypervisor.

In one embodiment, the production data files include production data required by the virtual machine for application development and testing. The production data is part of one or more live production datasets. In another embodiment, the virtual disk in the storage system is a sparse file, the virtual machine employs a thin-provisioned virtual disk, and the thin-provisioned virtual disk stores changes to the production data files made by the virtual machine.

In certain embodiments, the storage system is part of a production environment, and the virtual machine and the client are part of an application development and testing environment. In one embodiment, the re-mapping permits the virtual machine to access the production data files by directing the read operation to the allocated storage space instead of the production data files.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
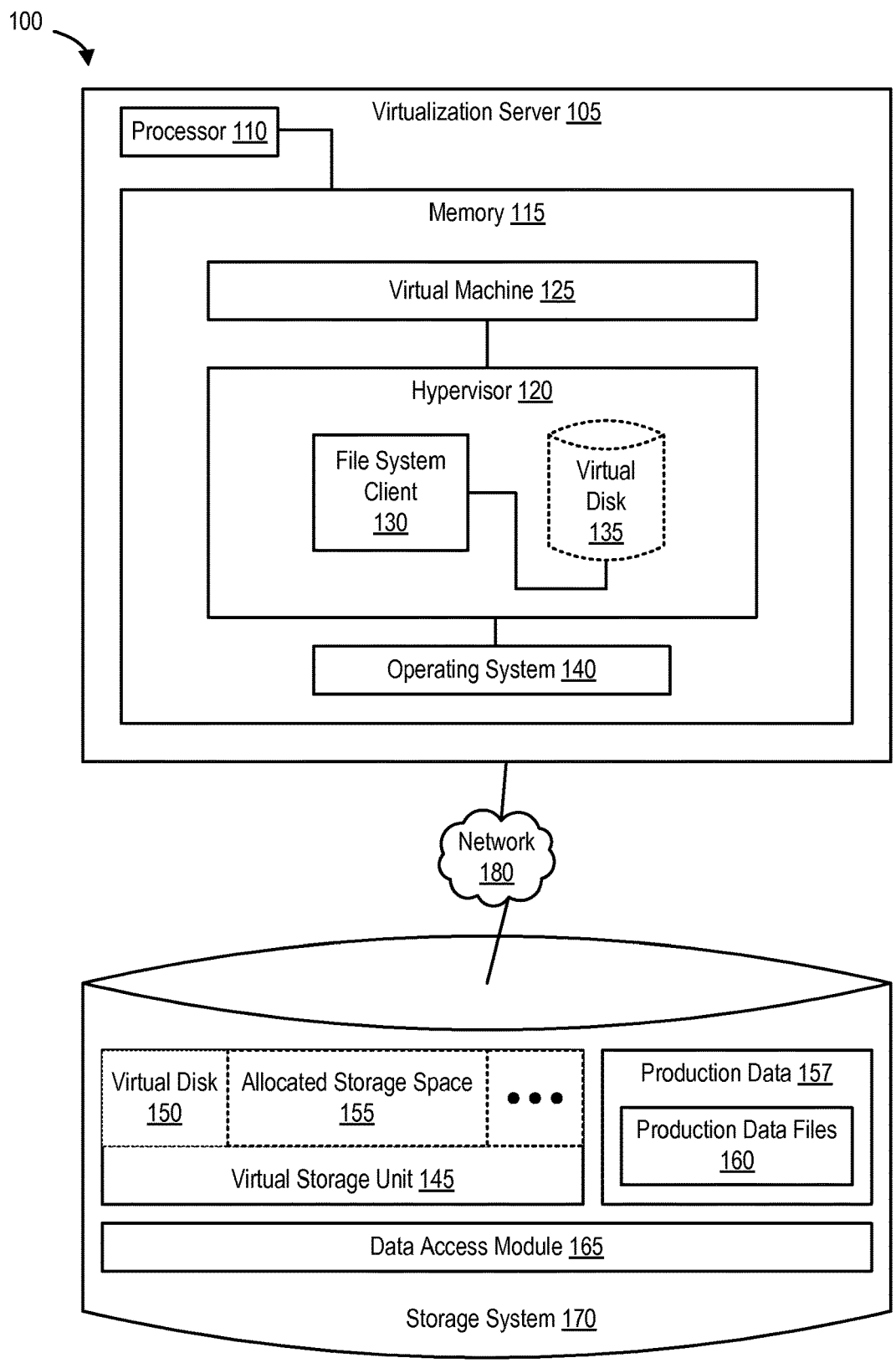
FIG. 1 is a block diagram of a virtualization server communicatively coupled to a storage system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Application development and testing environments, preferably, operate on production (as opposed to test) data, in order to perform such development and testing in conditions that mimic real-world environments. However, such production data sets can be quite large. Such production data needs to be accessible to one or more virtual machines running the applications being developed and tested (called application virtual machines) in a timely manner. Given the nature of application development and testing environments, a copy of production data may need to be refreshed multiple times. The initial provisioning of such data, as well as its subsequent refreshing, can thus require multiple copies of the production data to be made and transferred to the application development and testing environment from a production environment (e.g., from a storage stack in a storage appliance).

Typically, production data is not changed (or modified) to a significant extent when subject to application development and testing. By some estimates, in fact, a considerable portion of the copy of the production data used during application development and testing remains the same. For example, if production data required for application development and testing is one (1) terabyte (TB), a copy of the 1 TB production data set has to be made initially for such development and testing. Subsequently, if the application development and testing process requests the copy of the production data to be refreshed, another 1 TB copy of the production data set has to be created. However, typically the application development and testing process only changes (or modifies) a small percentage (e.g., five percent (5%)) of the copy of the 1 TB production data set. The remaining ninety five percent (95%) of the copy of the 1 TB production data set remains the same (e.g., is un-changed).

Therefore, provisioning production data to application development and testing environments by copying the production data poses at least two problems. First, initially provisioning the application development and testing environment with production data cannot be accomplished in a timely manner because creating a copy of a large production data set consumes a significant amount of time. Second, each time a refreshed copy of the production data is needed to continue the application development and testing, considerable additional time is wasted making another copy of the large production data set. Making repeated copies of production data is also redundant because a significant portion of the existing copy of the production data remains the same.

Disclosed herein are methods, systems, and processes that optimize access to production data in application development and testing environments.

An Example Application Development and Testing Environment

Application development and testing is performed on copies of one or more production data files that are representative of production (or live) data files (e.g., a real customer database in present use by a commercial entity). Such development and testing ensures that applications perform appropriately and as expected in a real-world scenario. A copy (or a cover snapshot) of production data files (which is representative of production data and/or production environment) can be used for application development and testing. The application development and testing environment described herein is simply an example of situations in which it is preferable to use live data, but its use does not allow for any modifications thereto. Environments with different configurations than the one shown herein are also envisioned.

To perform such development and testing, scaled-down virtual machines are often used. For example, if a company is using web server software in the production environment, is preferable to use a scaled-down virtual machine that also runs such web server software (e.g., if the production environment supports a thousand (1000) customers, the scaled-down virtual machine in the application development and testing environment might support only ten (10) customers). In this manner, the production environment (given the importance of the accuracy of production data) is not affected.

FIG. 1 is a block diagram of a computing system that implements a virtualization server, according to one embodiment. Virtualization server 105 is a computing device that includes a processor 110 and a memory 115. Virtualization server 105 can be any type of computing device including a server, a desktop, a laptop, a tablet, and the like.

Memory 115 implements the virtualization environment to perform application development and testing. Memory 115 includes a virtual machine 125, a hypervisor 120 that implements a file system client 130 and a virtual disk 135 (virtual disk 135 is shown with dotted lines to illustrate that virtual disk 135 is not a separate virtual disk, but refers to virtual disk 150 that is imported from a storage system for allocation, as will be discussed herein).

As noted, memory 115 also implements hypervisor 120 and operating system 140. As shown in FIG. 1, hypervisor 120 can be implemented using software. However, hypervisor 120 can also be a native or bare-metal hypervisor. In addition, other embodiments can implement different number of virtual machines per virtualization server, and a virtualization server can include additional computing devices that each implement the same or different number of virtual machines than other computing devices within the same virtualization server.

FIG. 1 also illustrates a storage system 170. Storage system 160 can be a storage appliance and/or can include one or more of a variety of different storage devices, including hard drives, compact discs, digital versatile discs, solid-state drives, memory such as Flash memory, or an array, and the like. A data access module 165 can provide an interface between storage system 170 and virtualization server 105 via network 180. It is noted that any other appropriate network or interconnection can be used instead of and/or in addition to network 180.

In addition to data access module 165, storage system 170 also includes a virtual storage unit 145. Virtual storage unit 145 implements a virtual disk 150. Virtual storage unit 145 can function as a standalone virtual disk or can implement one or more virtual disks. Virtual disk 150 includes allocated storage space 155. Storage system 170 also includes production data files 160. In this example, storage system 170 implements a production environment by providing one or more applications access to production data files 160.

Figure 2:
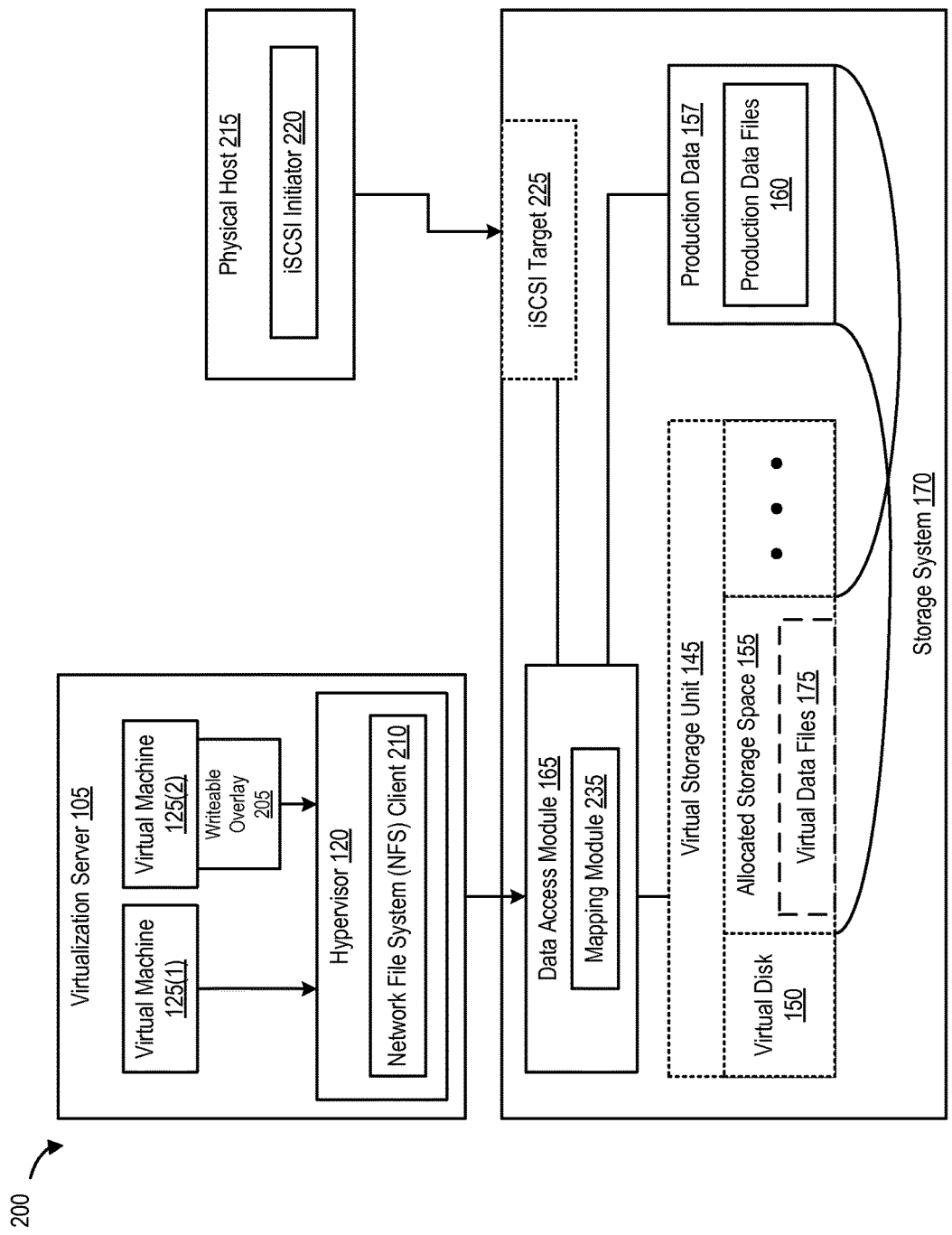
FIG. 2 is a block diagram of an application development and testing environment, according to one embodiment of the present disclosure.

FIG. 2 is a block diagram of an application development and testing environment, according to one embodiment. Like FIG. 1, FIG. 2 also includes virtualization server 105 which implements two virtual machines: virtual machines 125(1) and 125(2). Virtual machine 125(2) is coupled to a writeable overlay 205. Both virtual machines 125(1) and 125(2) are coupled to hypervisor 120 which implements a Network File System (NFS) client 210. NFS client 210 is a type of file system client (e.g., client 130 as shown in FIG. 1).

In one embodiment, writeable overlay 205 includes a content log provided on a thin-provisioned virtual disk that stores changes to the production data files made by virtual machine 125(2). For example, overlay file 205 is provided on a thin-provisioned virtual disk (e.g., a differential virtual disk) that stores changes to the production dataset made by virtual machine 125(2). NFS client 210 can access an overlay file to identify data blocks that can be served to a virtual machine from the virtual machine's overlay file (e.g., using the content log). In other examples, the NFS client does not access the writeable overlay (e.g., virtual machine 125(1)). If the hypervisor determines that the production data files requested are in the writeable overlay, the hypervisor serves the production data from the writeable overlay. If the hypervisor determines that the production data requested is not in the writeable overlay, the hypervisor communicates with the NFS client to fetch the production data files from the storage system.

FIG. 2 also shows a physical host 215 which implements an iSCSI initiator 220. Physical host 215 can be any type of computing device including a server, a desktop, a laptop, a tablet, and the like. iSCSI initiator 220 enables physical host 215 to connect to storage system 170 through network 180, or some other type of network and/or interconnection. Virtualization server 105 and physical host 215 can each be used to perform application development and testing, either alone or in combination. Therefore, virtualization server 105 (with virtual machines 125(1) and 125(2)) and physical host 215 can collectively be referred to as the application development and testing environment.

Storage system 170 as shown in FIG. 2, includes data access module 165 which provides an interface between the application development and testing environment and the production environment (e.g., storage system 170). Data access module 165 includes a mapping module 235. In addition, storage system 170 includes a iSCSI target 225, and virtual storage unit 145. Virtual storage unit implements a virtual disk 150. Virtual disk 150 includes allocated storage space 155, which further stores virtual data files 175. Storage system 170 also includes production data files 160 in production data 157, as shown in FIGS. 1 and 2. As noted, virtual storage unit can be a virtual disk, or can implement one or more virtual disks.

In one embodiment, the system of FIG. 2 can be used to provide access to production data files 160. For example, data access module 165 determines whether an input/output (I/O) operation generated by virtual machines 125(1) or 125(2), or physical host 215 is a write operation (or simply a write). If the I/O operation is a write, data access module 165 performs the write to virtual data files 175. It should be noted that virtual data files 175 are stored in virtual disk 150 (e.g., also referred to as a base virtual disk) which is part of virtual storage unit 145. Virtual data files 175 are part of allocated storage space 155 on virtual disk 150. In this example, allocated storage space 155 can be allocated on virtual disk 150 by data access module 165.

In another embodiment, data access module 165 determines whether the I/O operation (received from virtualization server 105 or from physical host 215) is a read operation (or simply a read). If the I/O operation is a read, data access module 165 determines a storage location on virtual storage unit 145 at which the read is to be performed. Data access module 165 also determines whether an earlier write was performed at that storage location. If an earlier write was performed at that storage location, data access module 165 performs the read on virtual data files 175. However, if the earlier write was not performed at that storage location, data access module 165 performs the read on allocated storage space 155.

An Example of Optimizing Access to Production Data

Figure 3:
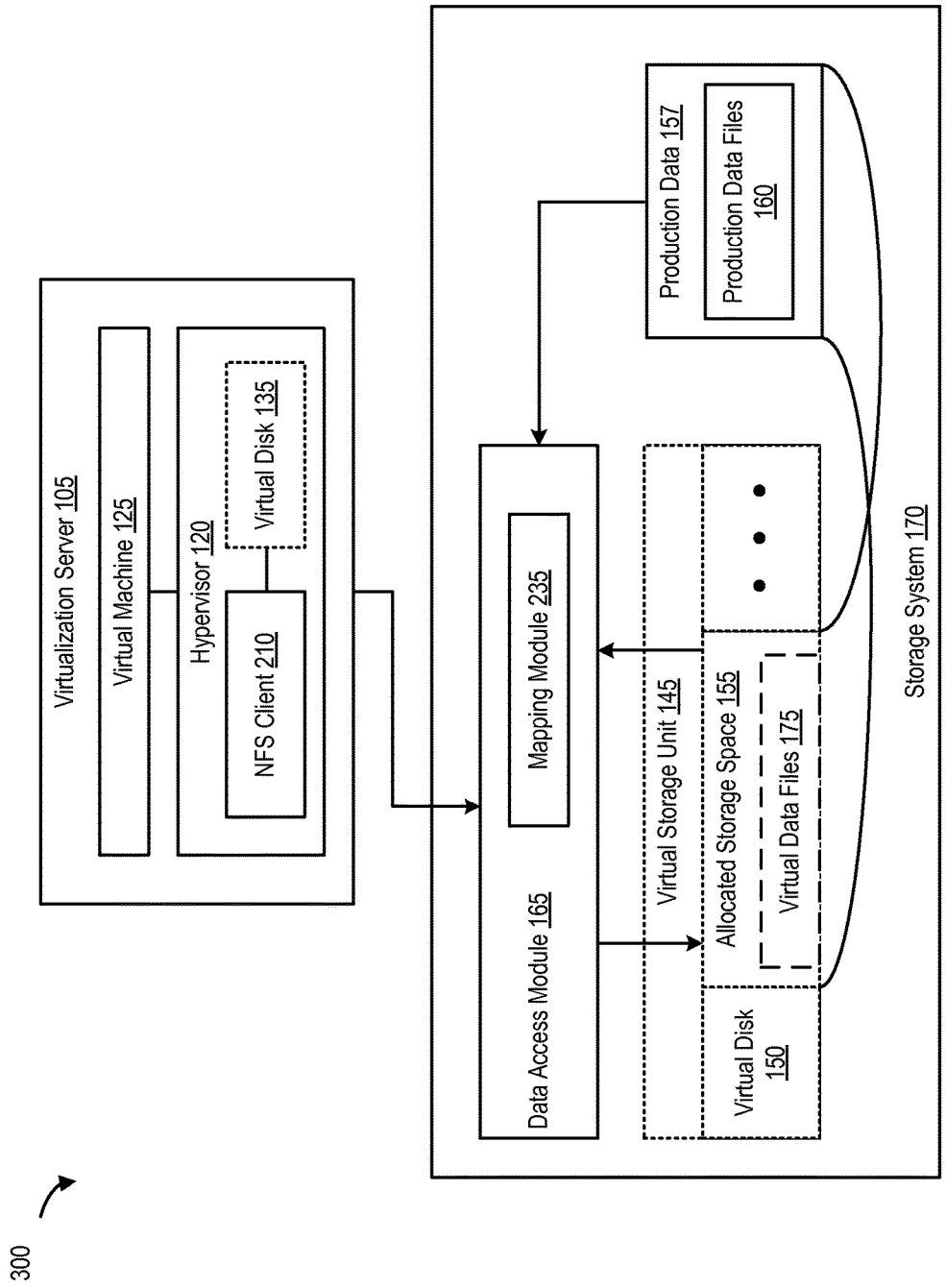
FIG. 3 is a block diagram of a data access module that can be used to provide access to production data, according to one embodiment of the present disclosure.

FIG. 3 is a block diagram of a data access module that can be used to provide access to production data, according to one embodiment. Like FIGS. 1 and 2, FIG. 3 shows virtualization server 105 that is implemented as an application development and testing environment and storage system 170 that is implemented as a production environment. Virtualization server 105 includes virtual machine 125 and hypervisor 120. Hypervisor 120 further implements NFS client 210, and virtual disk 135, which as noted previously, is a thin-provisioned virtual disk. NFS client 210 provides an interface mechanism between the I/O operations (e.g., reads and/or writes) generated by virtual machine 125 and storage system 170.

Hypervisor 120 implements a data store that can store virtual data files, virtual machine specifications, templates, and the like (e.g., virtual disk 135 as shown in FIGS. 1 and 3). The hypervisor can bind the virtual data files to a virtual machine as Small Computer System Interface (SCSI) block devices for operating system 140 executing (or running) on virtual machine 125. The data store can be backed by a file system (e.g., the hypervisor's own proprietary file system or an NFS file system). When the data store is backed by the NFS file system, NFS client 120 on hypervisor 120 can be used to mount the NFS file system that is served by an NFS server. The NFS server can run on another host device (e.g., a virtual device or a physical device). I/O operations to virtual disk 150 served from a data store (e.g., virtual disk 135) go through the backing file system (e.g., an NFS file system as described above).

When a hypervisor's proprietary file system is used instead, I/O operations can go through the proprietary file system, which in turn can perform actions such as provisioning storage (if required) for thin-provisioned virtual disk(s) (e.g., virtual disk 135), before allowing the I/O operations to proceed to appropriate areas in virtual data files 175. For the NFS data store, the I/O operations are intercepted by NFS client 210, and redirected to the NFS server.

In some embodiments, data access module 165, using mapping module 235, receives an allocation map from virtual machine 125 at storage system 170. The allocation map includes information regarding allocated storage space 155. As noted, allocated storage space 155 can be allocated by data access module 165 on virtual disk 150 based on a request to do so from virtual machine 125. In this example, virtual data files 175 on allocated storage space 155 correspond to (and are mapped to) production data files 160 stored on storage system 170.

Mapping module 235 performs the mapping of virtual data files 175 on virtual disk 150 implemented on virtual storage unit 145 to production data files 160. Once mapping module 235 receives the allocation map from virtual machine 125, mapping module 235 converts information in the allocation map to one or more offsets associated with production data files 160. Mapping module 235 can retrieve the one or more offsets associated with production data files 160 by accessing the storage structure of production data files 160.

In one embodiment, mapping module 235 overlays the storage structure of production data files 160 over the allocation map received from virtual machine 125. In this example, the overlaying permits data access module 165 to re-map one or more I/O operations from virtual machine 125 directed to virtual data files 175 on allocated storage space 155 to production data files 160, which are stored separately on storage system 170. In this manner, data access module 165 can optimize access to production data files 160 by virtual machine 125 for application development and testing without copying having to copy the production data files.

In some embodiments, data access module 165 receives a request from virtual machine 125 (or other such virtual computing device on virtualization server 105) to create virtual storage unit 145. Based on such a request, data access module 165 creates virtual storage unit 145 in storage system 170. Virtual storage unit 145 can be used by virtual machine 125 to allocate allocated storage space 155. For example, if the total size of production data files 160 is 10 gigabytes (10 GBs), data access module 166 can create a virtual storage unit by creating a virtual disk (e.g., virtual disk 150), and allocate storage space on this (base) virtual disk as the allocated storage space (e.g., allocated storage space 155).

However, it should be noted that the virtual disk (e.g., virtual disk 150) created via data access module 165 (e.g., in the appropriate virtual machine disk (VMDK) format) is a sparse file. A sparse file is a type of file that can be created to utilize space on a file system more efficiently when the file itself is mostly empty. Therefore, although data access module 165 allocates storage space in virtual storage unit 145 based on production data files 160, the allocation (e.g., allocated storage space 155) does not actually consume 10 GBs of storage space (e.g., the actual size of the production data files). The only storage space consumed on virtual storage unit 145 as a result of the allocation is a small amount of storage space (e.g., to store metadata related to offsets, etc.).

As previously noted, mapping module 235 overlays the storage structure of production data files 160 over the allocation map received from virtual machine 125. The allocation map is created by virtual machine 125 by importing virtual disk 150 from storage system 170 to virtualization server 105, for example, by using NFS client 210. For example, virtual disk 150 (e.g., the allocated sparse file) is imported to hypervisor 120 executing on virtualization server 105. Hypervisor 120 then exports this virtual disk to virtual machine 125.

For example, and in some embodiments, virtual disk 150 is created as a sparse file on storage unit 170 (e.g., the sparse file is just an allocation). NFS client 210 in hypervisor 120 is directed to export this virtual disk 150. By doing so, NFS client 210 and virtual machine 125 are both able to access virtual disk 150. As noted, NFS client 210 exports the allocated sparse file (e.g., virtual disk 150) as another virtual disk (e.g., as virtual disk 135) to virtual machine 125.

In this manner, virtual machine 125 can allocate virtual data files 175 in allocated storage space 155. Data access module 165 can then fetch those allocations back from virtualization server 105 to storage system 170, and further, translate where those allocations (e.g., specified by virtual machine 125) are located on virtual disk 150. Mapping module 235 can then re-map those sections (or allocations) of virtual disk 150 to production data files 160 on storage system 170. The foregoing process makes production data files 160 instantly available to virtual machine 125 for application development and testing because the re-mapping permits virtual machine 125 to access production data files 160 by directing the reads to allocated storage space 155 instead of production data files 160.

In one embodiment, changes to production data files 160 performed by virtual machine 125, which as noted previously can be minor, are written to virtual data files 175 on virtual storage unit 145. In another embodiment, changes to production data files 160 performed by a virtual machine can be captured by a writeable overlay (e.g., implemented as a thin-provisioned virtual disk) as shown in FIG. 2.

Example Processes to Optimize Access to Production Data

Figure 4:
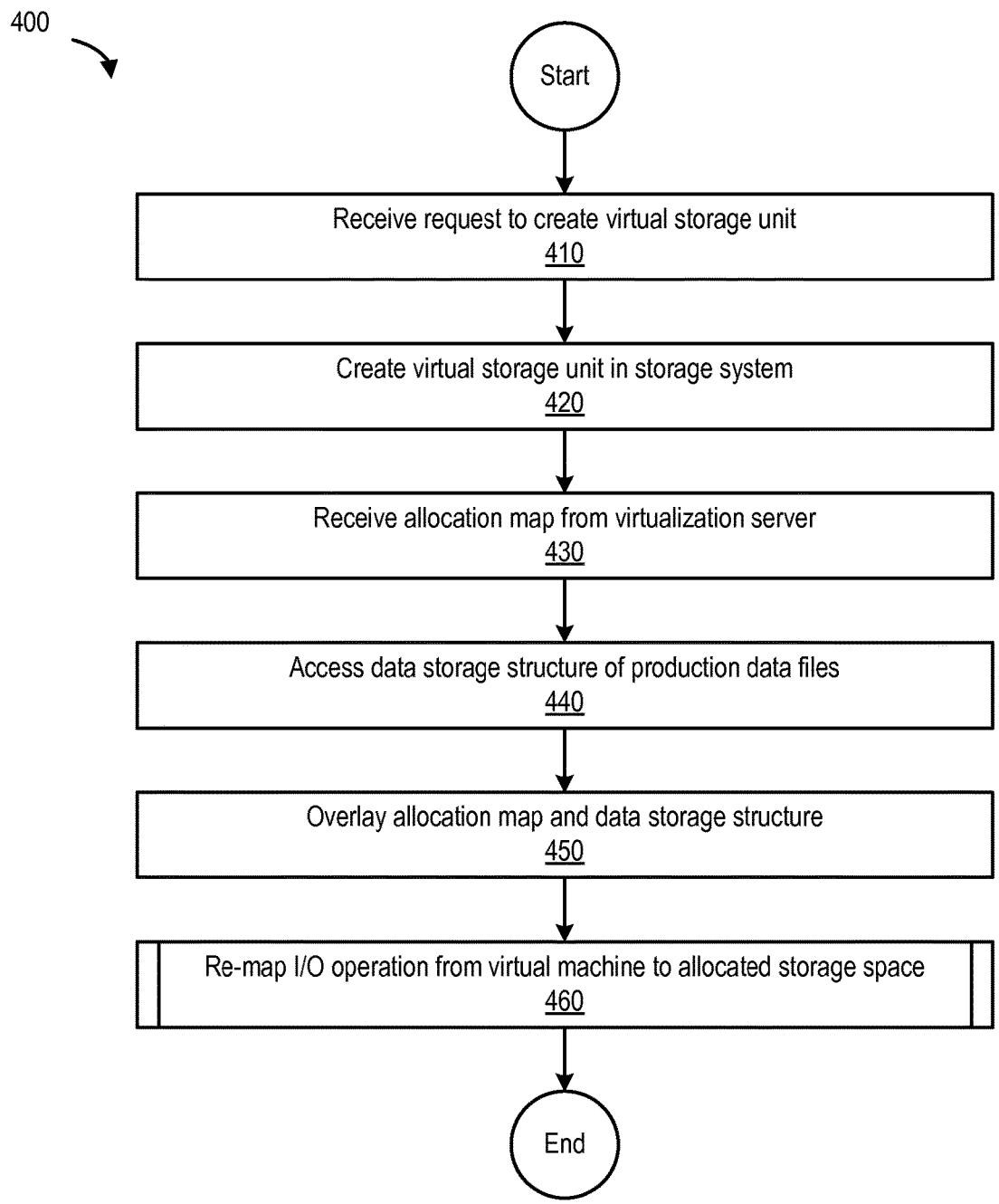
FIG. 4 is a flowchart that illustrates a process for re-mapping input/output (I/O) operations, according to one embodiment of the present disclosure.

FIG. 4 is a flowchart that illustrates a process for re-mapping I/O operations, according to one embodiment. The process begins at 410 by receiving a request (e.g., from virtual machine 125(1) or 125(2)) to create a virtual storage unit (e.g., virtual storage unit 145). At 420, the process creates a virtual storage unit in the storage system (e.g., data access module 165 creates virtual storage unit 145 in storage system 170).

As previously noted, virtual machines 125(1) or 125(2), or physical host 215 can allocate storage space on the virtual storage unit based on the production data files. It should be noted that allocating of storage space on the virtual storage unit only changes the metadata structure of the file system of virtual disk 150—I/O operations are not actually performed as a result of the allocation of storage space.

At 430, the process receives an allocation map from the virtualization server (e.g. from NFS client 210). At this point, data access module 165 determines the allocations created by the virtual machine and translates those allocations to the offsets of virtual disk 150. It should be noted that data file allocations are typically not contiguous in a file system. Therefore, data access module 165 translates each and every block allocated to the offsets of the virtual data files on virtual disk 150.

At 440, the process accesses the data storage structure of the production data files. At 450, the process overlays the allocation map and the data storage structure (e.g., by sharing one or more extents between the allocation map and the data storage structure (of the production data files)). At 460, the process proceeds to re-mapping I/O operations from the virtual machine(s) to the allocated storage space. In this manner, when the allocated storage space receives a read request, mapping module 235 re-maps the read request to one or more actual data file(s) of the production data files, and serves the requested data to the virtual machine from the production data files, thus removing the need to make a copy of the production data files. The process then concludes.

Figure 5:
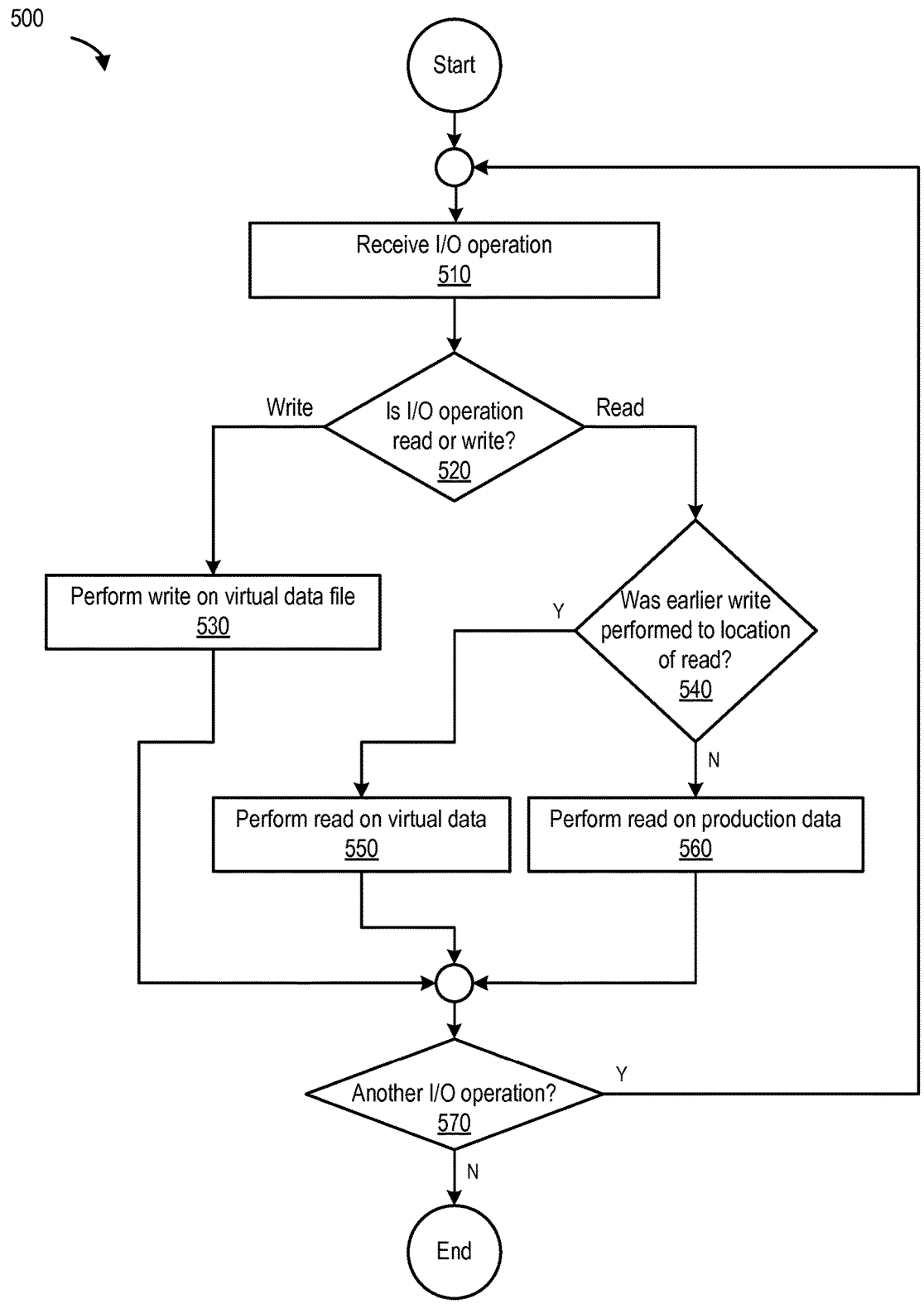
FIG. 5 is a flowchart that illustrates a process for providing access to production data, according to one embodiment of the present disclosure.

FIG. 5 is a flowchart that illustrates a process for optimizing access to production data, according to one embodiment. The process begins at 510 by receiving an I/O operation (e.g., at data access module 165). At 520, the process determines whether the I/O operation is a read or a write. If the I/O operation is a write, the process, at 530, performs the write on virtual data files (e.g., virtual data files 175). However, if the I/O operation is a read, the process, at 540, determines whether an earlier write was performed to the (storage) location of the read (e.g., on the virtual data files) to determine whether the read is requesting data that has been changed and/or modified).

If an earlier write was performed to the storage location of the read, the process, at 560, performs the read on virtual data (e.g., the virtual data files). However, if an earlier write was not performed to the storage location of the read, the process, at 560, performs the read on production data (e.g., data access module 165 can access the actual contents of production data files 160 to serve the read as a result of the translation and the re-mapping of allocations as illustrated in the flowchart of FIG. 5). The process ends at 570 by determining whether there are any additional I/O operations.

Figure 6:
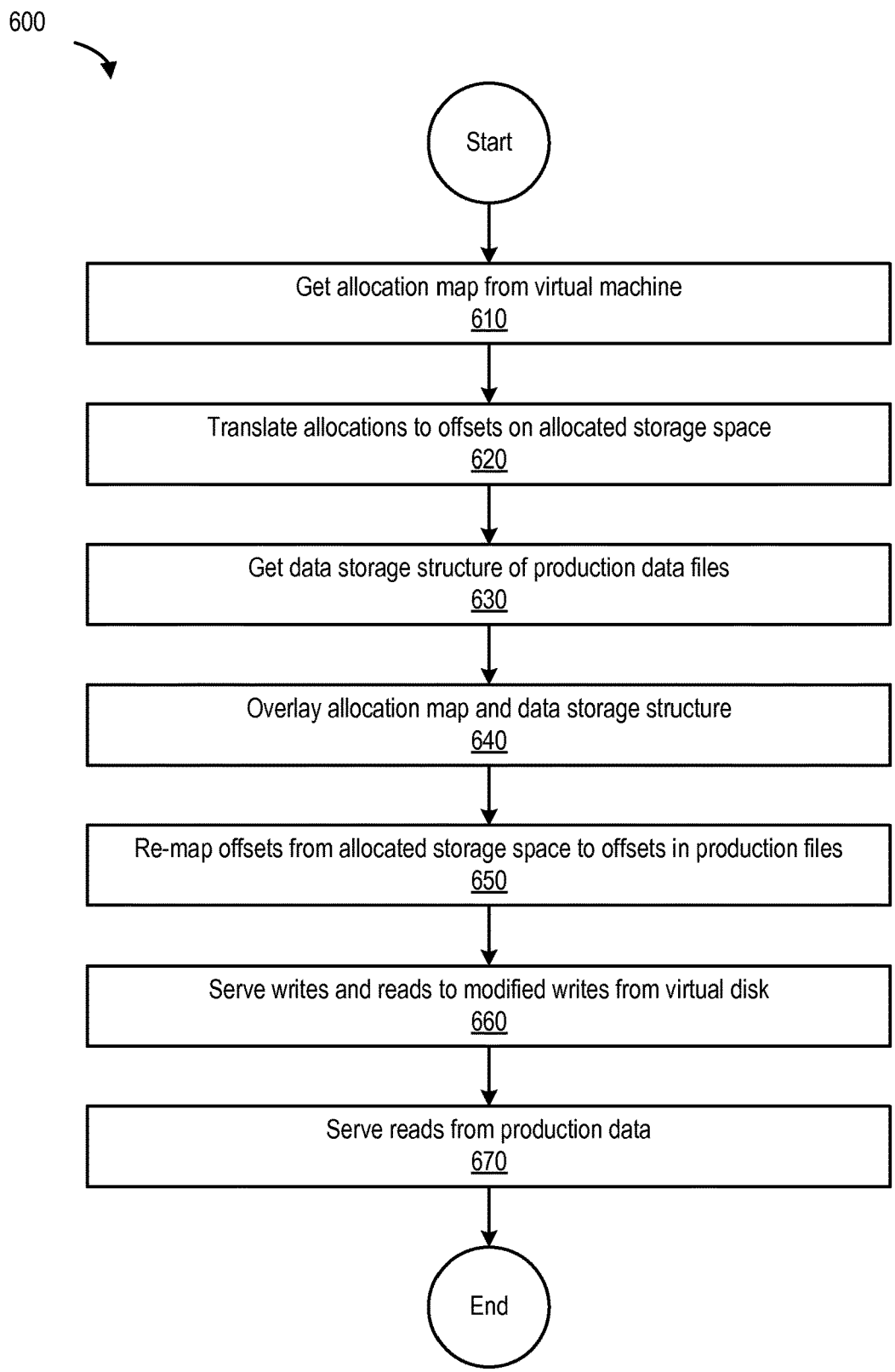
FIG. 6 is a flowchart that illustrates a process for serving read operations from production data, according to one embodiment of the present disclosure.

FIG. 6 is a flowchart that illustrates a process for serving read operations from production data, according to one embodiment. The process begins at 610 by getting (or receiving) an allocation map from a virtual machine. Because virtual machine 125 can allocate the allocated storage space on a virtual storage unit, virtual machine 125 can retain information about the allocation in the form of an allocation map (e.g., the directory of the virtual disk file system in which one or more virtual data files are created, the size of the one or more virtual data files etc.). As previously noted, such an allocation reduces only the free space of the file system (and not the storage system), because I/O operations are not yet written to the virtual data files in the allocated storage space.

At 620, the process translates the allocations to offsets on the allocated storage space. For example, data access module 165 can receive the allocation map (also referred to as block allocation map) from NFS client 210 which includes the information about one or more virtual data files allocated by the virtual machine on the allocated storage space. After receiving the block allocation map, mapping module 235 translates the allocations of the virtual data files received from the virtual machine (and contained in the allocation map) to the offsets of the virtual data files in the allocated storage space on the storage system.

At 630, the process gets (or receives) a data storage structure of the production data files. The data storage structure of the production data files can be received in the form of another block allocation map, or in some other format that reveals the offsets of the production data files. At this point, the process, via mapping module 235, has access to two block maps. The first block map is the allocation map received from the virtual machine. The second block map is the data storage structure of the production data files present in the storage system. At 640, the process overlays the allocation map (received from the virtual machine) and the data storage structure (e.g., the second block map stored in the storage system).

For example, the allocation map can reveal the offset of a virtual data file in the virtual disk associated with the virtual machine (e.g., virtual disk 135) as well as the length of the virtual data file. Upon overlaying, this allocation of the virtual data file in the virtual disk file system (e.g., by the virtual machine) can be used to determine the offset at which the virtual data file actually begins (and ends), as well as the size of the virtual data file, on the virtual disk in the storage system (e.g., in allocated storage space 155 of virtual disk 150 on virtual storage unit 145, as shown in FIG. 3).

At 650, the process re-maps offsets (of the virtual data files) in the allocated storage space to offsets of the actual data in the production data files in production data 157. In this manner, the process of FIG. 6 can serve the production data files to one or more virtual machines without copying the production data files. Consequently, at 660, the process serves writes (and reads to modified writes) from the virtual disk (e.g., from virtual data files 175 in allocated storage space 155). However, because a significant portion of production data typically remains un-changed during application development and testing, the process ends at 670 by serving reads from production data 157 (e.g., from production data files 160).

Figure 7:
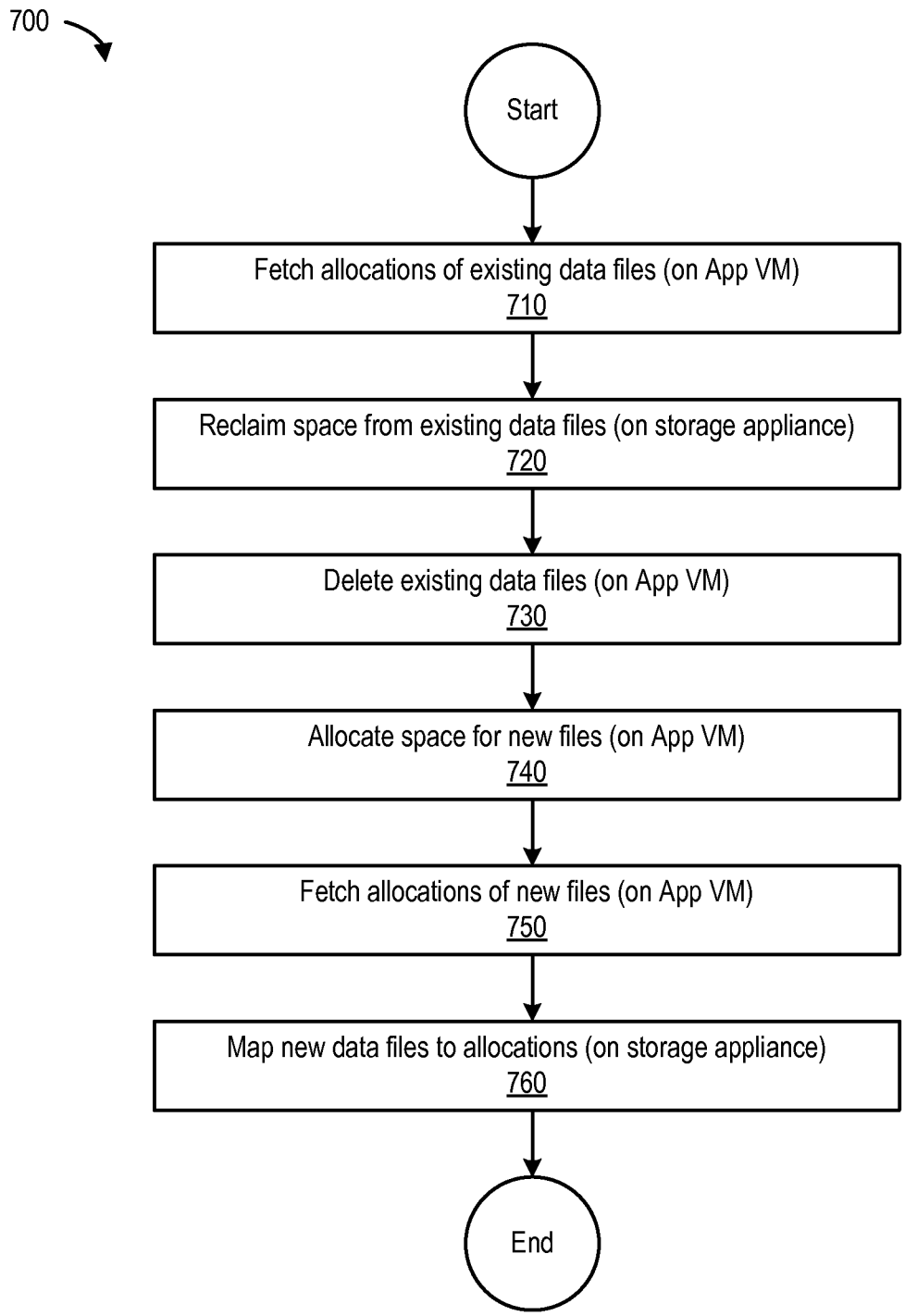
FIG. 7 is a flowchart that illustrates a process for mapping new data files to new allocations, according to one embodiment of the present disclosure.

FIG. 7 is a flowchart that illustrates a process for conducting application development and testing on the same copy of production data, or with a newer copy (e.g., a newer version) of the production data, according to one embodiment. In one embodiment, this (production) data refreshing process can be accomplished using the same virtual disk connected to virtual machine 125 (e.g., virtual disk 135 as shown in FIG. 1). The process begins at 710 by fetching allocations of existing virtual data files (e.g., from virtual machine 125 using data access module 165). At 720, the process reclaims space from the (existing) virtual data files on storage system 170 (e.g., on virtual disk 150). At 730, the process deletes these (existing) virtual data files (on virtual machine 125).

At 740, the process allocates space for new virtual data files on virtual machine 125 (e.g., using file system client 130 and virtual disk 135). At 750, the process fetches allocations for these (new) virtual data files from virtual machine 125. The process ends at 760 by mapping new virtual data files to these allocations on storage system 170.

Examples of Methods for Sharing Data Extents

In one embodiment, a mapper method can be used to share data extents between a virtual disk file system and a host file system. In this example, a mapper (e.g., implemented in mapping module 235) permits a virtual data file to be specified as a function of a set of virtual data files. Mapper is a software component that is implemented in the I/O path between an application to a file system. The mapper creates a view of a file as composed of blocks of other files. An example mapping specification can include: [File1]; FileA, 0, 0, 10; FileB, 0, 10, 20; and FileC, 50, 30, 10. The mapper can use this specification of the virtual data file as a function of a set of virtual data files to identify individual files in the host file system namespace from a composite file (e.g., a tar file). The mapper also allows specification of virtual data file content as an aggregation over multiple production data files. The mapper can be used to designate regions of a virtual disk to be used for identifying the production data files. Therefore, when an I/O operation is performed to the virtual disk, data access module 165 can intercept the I/O operation and provide data from the production data files.

For example, the mapper can read the above example specification as follows: (1) Create a file named "File1" where the contents of File1 are composed over files FileA, FileB, and FileC. The first number (e.g., 0, 0, and 50 in FileA, FileB, and FileC respectively) of the three numbers is read as an offset in the specified file. The second number (e.g., 0, 10, and 30 in FileA, FileB, and FileC respectively) is the offset in File1, and the third number of the three numbers (e.g., 10, 20, and 10 in FileA, FileB, and FileC respectively) is the length of the content of that file. For example, ten (10) blocks starting at offset zero (0) from FileA are used to form (or allocated for) contents of File1 at offset zero (0). Similarly, twenty (20) blocks starting at offset 0 from FileB are used to form contents of File1 at offset 10. Likewise, 10 blocks starting at offset 50 from FileC are used to form the contents of File1 at offset 30.

Therefore, in some embodiments, when File1 is read at offset 0, the mapper serves the contents of File1 from FileA for 10 blocks, File B for the next 20 blocks, and FileC for the final 10 blocks. For example, if an application reads 10 blocks of File1 at offset five (5), the mapper serves the first 5 blocks from FileA and the next 5 blocks from FileB.

In another embodiment, a native file system method can be used to share data extents between the virtual disk file system and the host file system. The native file system method makes a production data file available to a virtual data file where both the production data file and the virtual data file can act as a file system to another host (e.g., as a nested file system).

A nested file system is a file system where a file in the file system includes data that forms a complete file system in itself. For example, virtual data files 175 can host a complete file system that is visible and useable by guest operating systems (e.g., operating system 140). For a host file system (e.g., a file system implemented on or by hypervisor 120), a virtual data file is just a file. In one embodiment, a view of a file system hosted by a virtual disk can be created. In this example, the file system contents can be served from a different file rather than copying the file system contents within the virtual disk. The contents can be made available virtually using, for example, the mapper method as described above.

With regard to the above examples of the mapper method and the native file system method, and in one or more embodiments, the storage system includes a file system, and the virtual disk on the storage system also includes a separate file system. The storage system's file system is the host file system, and the virtual disk's file system is the virtual disk file system. In these examples, the virtual disk file system manages the virtual data files of the virtual machine, and the host file system manages the production data files stored in the storage system.

An Example Computing Environment

Figure 8:
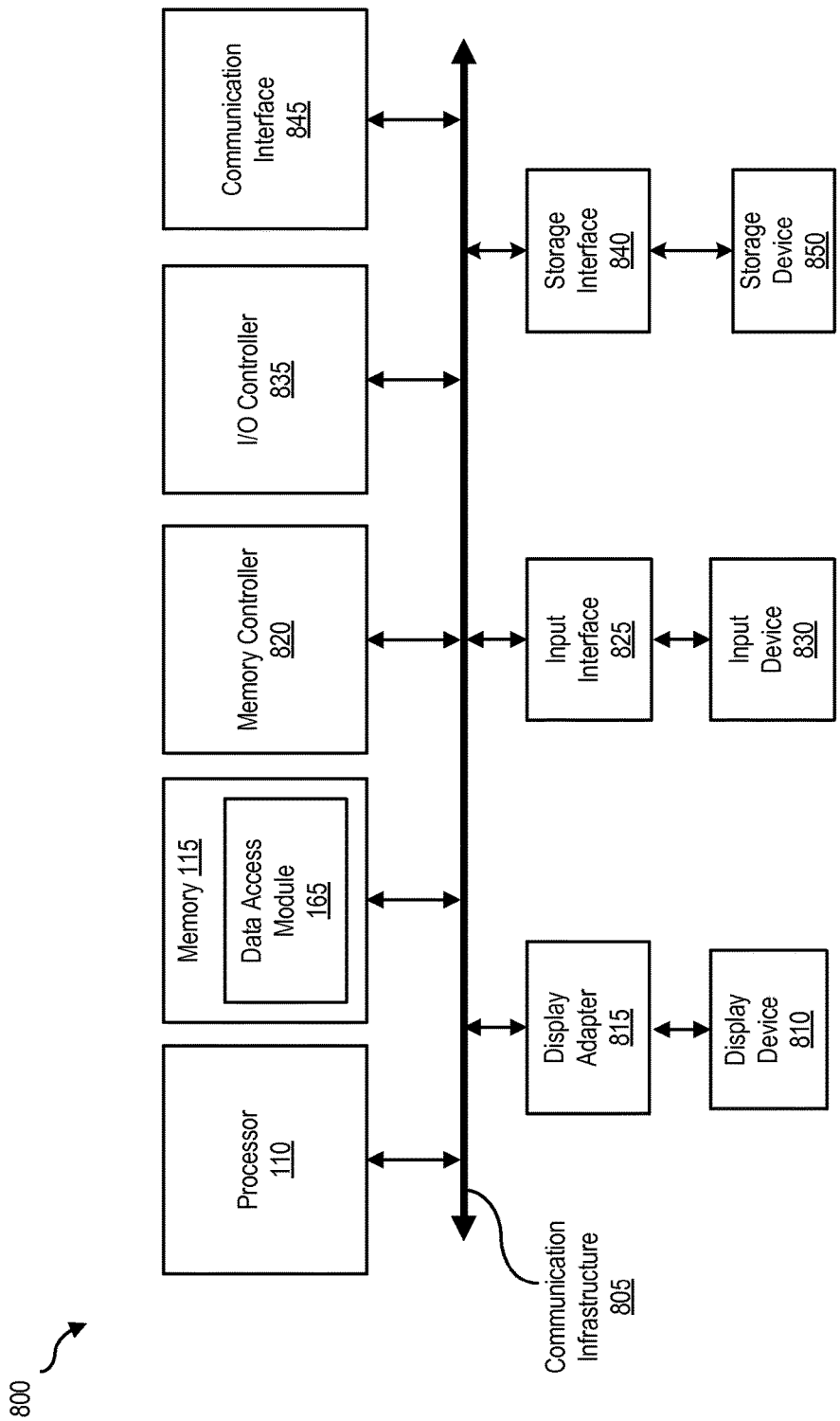
FIG. 8 is a block diagram of a computing system that illustrates a hypervisor that can be implemented in software, according to one embodiment of the present disclosure.

FIG. 8 is a block diagram of a computing system, illustrating how a data access module can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a memory 115. By executing the software that implements virtualization server 105, computing system 800 becomes a special purpose computing device that is configured to optimize access to (and of) production data, for example, in application development and testing environments.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a data access module, a mapping module, and/or a hypervisor may be loaded into memory 115.

In certain embodiments, computing system 800 may also include one or more components or elements in addition to processor 110 and memory 115. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 110, memory 115, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtualization server and/or a computing device. For example, in certain embodiments I/O controller 835 may control or facilitate transfer of data between one or more elements of computing system 800, such as processor 110, memory 115, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800.

Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 115 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
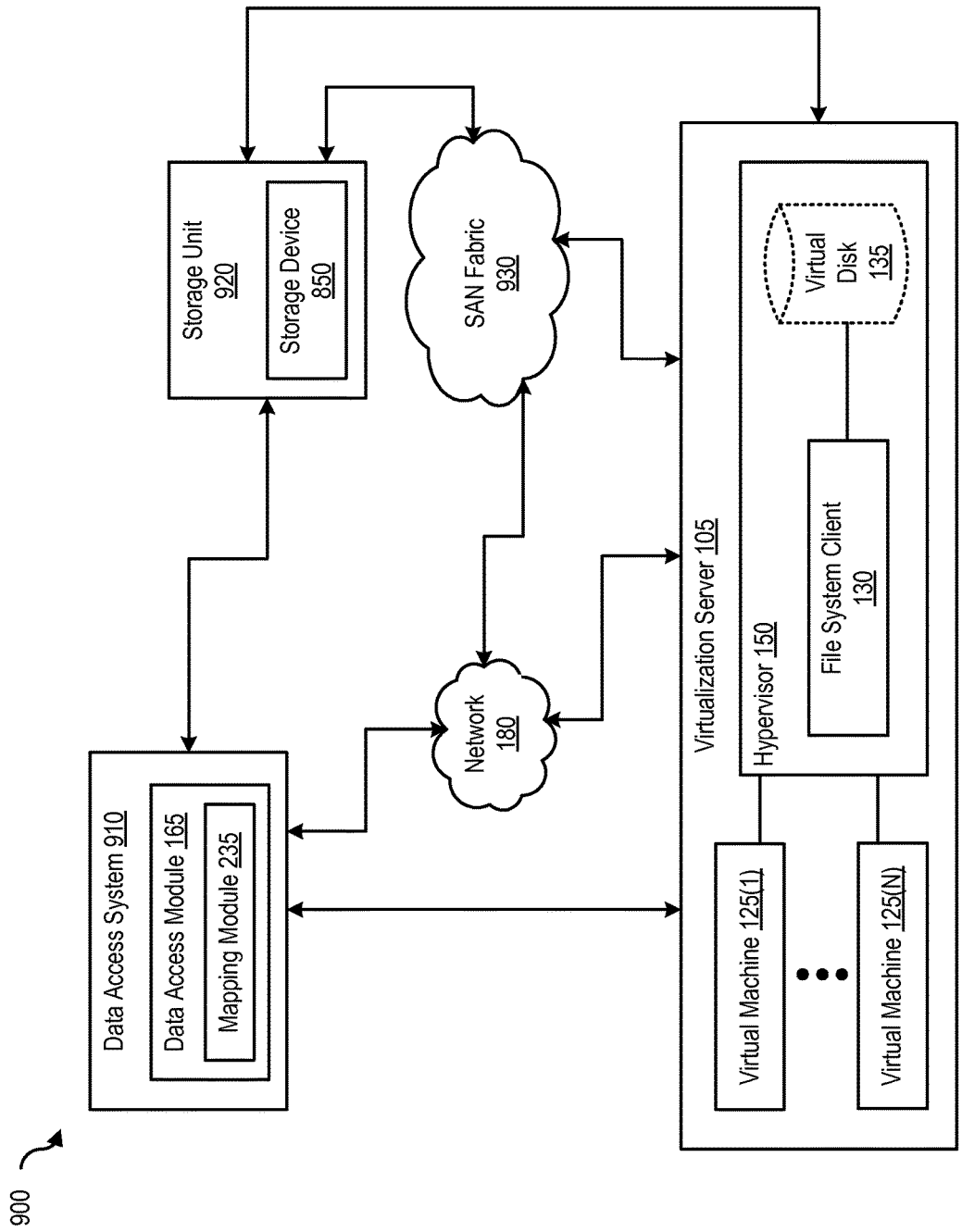
FIG. 9 is a block diagram of a networked system that illustrates how various computing devices can communicate via a network, according to one embodiment of the present disclosure.

FIG. 9 is a block diagram of a networked system, illustrating how various computing devices can communicate via a network, according to one embodiment of the present disclosure. In certain embodiments, network-attached storage (NAS) devices may be configured to communicate with virtualization server 310 using various protocols, such as Network File System (NFS), Server Message Block (SMB), or Common Internet File System (CIFS).

Network 180 generally represents any type or form of computer network or architecture capable of facilitating communication between multiple computing devices. Network 180 may facilitate communication between virtualization server 105 and storage system 170. In certain embodiments, and with reference to computing system 800 of FIG. 8, a communication interface, such as communication interface 845 in FIG. 8, may be used to provide connectivity between virtualization server 105 and network 180. It should be noted that the embodiments described and/or illustrated herein are not limited to the Internet or any particular network-based environment. For example, network 180 can be a Storage Area Network (SAN).

In at least one embodiment, all or a portion of one or more of the embodiments disclosed herein may be encoded as a computer program and loaded onto and executed by virtualization server 105, virtual machine 125, and hypervisor 120, or any combination thereof. All or a portion of one or more of the embodiments disclosed herein may also be encoded as a computer program, stored on virtualization server 105, virtual machine 125, and/or hypervisor 120, and distributed over network 180.

In some examples, all or a portion of the virtualization server in FIGS. 1, 2, and 3 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, storage system 170, virtualization server 105, virtual machine 125, and/or hypervisor 120 may transform the behavior of a storage system and/or a virtualization server in order to cause the storage system and/or the virtualization server to optimize access to production data in application development and testing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving an input/output operation from a first application, at a storage system, wherein
      the input/output operation is directed to a virtual data file stored in an allocated storage space,
      the allocated storage space has been allocated within a virtual disk in a virtual storage unit in the storage system,
      the storage system comprises one or more storage devices, in which is stored
         production data comprising one or more production data files, and
         the virtual storage unit,
      the one or more production data files are configured for present use by a second application, and
      the one or more production data files and virtual storage unit are stored separately from one another in the storage system;
   determining whether the input/output operation is a read operation or a write operation;
   in response to a determination that the input/output operation is the write operation, performing the write operation on the virtual data file; and
   in response to a determination that the input/output operation is the read operation,
      determining a storage location on the virtual storage unit at which the read operation is to be performed,
      determining whether an earlier write operation was performed at the storage location,
      in response to determining that the earlier write operation was performed at the storage location, performing the read operation at a location in the virtual data file corresponding to the storage location, and
      in response to determining that the earlier write operation was not performed at the storage location, performing the read operation on the allocated storage space at the storage location, wherein
         the performing the read operation on the allocated storage space comprises
            serving data from a location in the one or more production data files corresponding to the storage location,
         the data is responsive to the read operation of the allocated storage space, and
         the serving is facilitated by the allocated storage space being mapped to the production data, at least with regard to the storage location.

2. The method of claim 1, further comprising:
   allocating the allocated storage space on the virtual disk, wherein
      the one or more production data files are accessible from a physical computing device executing the second application,
      the first application is an application being executed in an application development and testing environment,
      the second application is an application being executed in a production environment,
      the input/output operation is generated by a virtual machine executed by a virtualization server,
      the physical computing device and the virtualization server are separate from one another, and
      the virtualization server and the storage system are communicatively coupled to one another.

3. The method of claim 2, further comprising:
   receiving an allocation map from the virtual machine, wherein
      the allocation map comprises information regarding the allocated storage space,
      the allocated storage space is allocated by the virtual machine, and
      the allocated storage space corresponds, at least in part, to at least one of the one or more production data files;
   converting information in the allocation map to one or more offsets associated with the one or more production data files, wherein
      the one or more offsets are based on a storage structure of the one or more production data files; and
   overlaying the storage structure over the allocation map, wherein
      the overlaying facilitates the serving by permitting the storage system to re-map the input/output operation from the allocated storage space to the one or more production data files.

4. The method of claim 3, wherein
the overlaying further facilitates the serving by permitting the virtual machine to access the one or more production data files by directing the read operation to the allocated storage space instead of the one or more production data files.

5. The method of claim 2, further comprising:
receiving a request from the virtualization server to create the virtual storage unit; and
based on the receiving, creating the virtual storage unit in the storage system, wherein
the virtual storage unit is used by the virtual machine to allocate the allocated storage space, and
the virtual disk on the virtual storage unit is created as a sparse file.

6. The method of claim 2, further comprising:
importing the virtual disk from the storage system to the virtualization server, wherein
the importing is performed by a client,
the client is a Network File System (NFS) client, and
the virtual disk is imported to a hypervisor executed by the virtualization server; and
exporting the virtual disk from the hypervisor to the virtual machine, wherein
the exporting is performed by the hypervisor.

7. The method of claim 6, wherein
the storage system is part of the production environment, and
the virtual machine and the client are part of the application development and testing environment.

8. The method of claim 2, wherein
the production data is part of one or more live production datasets.

9. The method of claim 2, wherein
the virtual disk in the storage system is a sparse file,
the virtual machine employs a thin-provisioned virtual disk, and
the thin-provisioned virtual disk stores changes to the one or more production data files made by the virtual machine.

10. The method of claim 1, wherein
the data is served from the one of the one or more production data files using a storage structure overlaid over an allocation map associated with the allocated storage space, and
the storage structure being overlaid over the allocation map facilitates serving the data by permitting the storage system to re-map the read operation from the allocated storage space to the one or more production data files.

11. A non-transitory computer readable storage medium comprising program instructions executable to:
receive an input/output operation from a first application, at a storage system, wherein
the input/output operation is directed to a virtual data file stored in an allocated storage space,
the allocated storage space has been allocated within a virtual disk in a virtual storage unit in the storage system,
the storage system comprises one or more storage devices, in which is stored
production data comprising one or more production data files, and
the virtual storage unit,
the one or more production data files are configured for present use by a second application, and
the one or more production data files and virtual storage unit are stored separately from one another in the storage system;
determine whether the input/output operation is a read operation or a write operation;
in response to a determination that the input/output operation is the write operation, perform the write operation on the virtual data file; and
in response to a determination that the input/output operation is the read operation,
determine a storage location on the virtual storage unit at which the read operation is to be performed,
determine whether an earlier write operation was performed at the storage location,
in response to determining that the earlier write operation was performed at the storage location, perform the read operation at a location in the virtual data file corresponding to the storage location, and
in response to determining that the earlier write operation was not performed at the storage location, perform the read operation on the allocated storage space at the storage location, wherein
the program instructions executable to perform the read operation on the allocated storage space comprise further program instructions executable to
serve data from a location in the one or more production data files corresponding to the storage location,
the data is responsive to the read operation of the allocated storage space, and
serving of the data is facilitated by the allocated storage space being mapped to the production data, at least with regard to the storage location.

12. The non-transitory computer readable storage medium of claim 11, further comprising program instructions executable to:
allocate the allocated storage space on the virtual disk, wherein
the one or more production data files are accessible from a physical computing device executing the second application,
the first application is an application being executed in an application development and testing environment,
the second application is an application being executed in a production environment,
the input/output operation is generated by a virtual machine executed by a virtualization server,
the physical computing device and the virtualization server are separate from one another, and
the virtualization server and the storage system are communicatively coupled to one another.

13. The non-transitory computer readable storage medium of claim 12, further comprising program instructions executable to:
receive an allocation map from the virtual machine, wherein
the allocation map comprises information regarding the allocated storage space,
the allocated storage space is allocated by the virtual machine, and
the allocated storage space corresponds, at least in part, to at least one of the one or more production data files;
convert information in the allocation map to one or more offsets associated with the one or more production data files, wherein
the one or more offsets are based on a storage structure of the one or more production data files; and
overlay the storage structure over the allocation map, wherein the program instructions executable to facilitate the serving of the data by permitting the storage system to re-map the input/output operation from the allocated storage space to the one or more production data files.

14. The non-transitory computer readable storage medium of claim 13, wherein
the production data is part of one or more live production datasets,
the virtual disk in the storage system is a sparse file,
the virtual machine employs a thin-provisioned virtual disk,
the thin-provisioned virtual disk stores changes to the one or more production data files made by the virtual machine, and
the program instructions executable to overlay further facilitate the serving by permitting the virtual machine to access the one or more production data files by directing the read operation to the allocated storage space instead of the one or more production data files.

15. The non-transitory computer readable storage medium of claim 12, further comprising program instructions executable to:
receive a request from the virtualization server to create the virtual storage unit;
based on receipt of the request,
create the virtual storage unit in the storage system, wherein
the virtual storage unit is used by the virtual machine to allocate the allocated storage space, and
the virtual disk on the virtual storage unit is created as a sparse file;
import the virtual disk from the storage system to the virtualization server, wherein
the program instructions executable to import are executed by a client,
the client is a Network File System (NFS) client, and
the virtual disk is imported to a hypervisor executed by the virtualization server; and
export the virtual disk from the hypervisor to the virtual machine, wherein
the exporting is performed by the hypervisor.

16. A system comprising:
one or more processors; and
a non-transitory computer readable storage medium coupled to the one or more processors, wherein the non-transitory computer readable storage medium stores program instructions executable by the one or more processors to
receive an input/output operation from a first application, at a storage system, wherein
the input/output operation is directed to a virtual data file stored in an allocated storage space,
the allocated storage space has been allocated within a virtual disk in a virtual storage unit in the storage system,
the storage system comprises one or more storage devices, in which is stored
production data comprising one or more production data files, and
the virtual storage unit,
the one or more production data files are configured for present use by a second application, and
the one or more production data files and virtual storage unit are stored separately from one another in the storage system,
determine whether the input/output operation is a read operation or a write operation,
in response to a determination that the input/output operation is the write operation, perform the write operation on the virtual data file,
in response to a determination that the input/output operation is the read operation,
determine a storage location on the virtual storage unit at which the read operation is to be performed,
determine whether an earlier write operation was performed at the storage location,
in response to determining that the earlier write operation was performed at the storage location, perform the read operation at a location in the virtual data file corresponding to the storage location, and
in response to determining that the earlier write operation was not performed at the storage location, perform the read operation on the allocated storage space at the storage location, wherein
the program instructions executable by the one or more processors to perform the read operation on the allocated storage space comprise program instructions executable by the one or more processors to serve data from a location in the one or more production data files corresponding to the storage location,
the data is responsive to the read operation of the allocated storage space, and
serving of the data is facilitated by the allocated storage space being mapped to the production data, at least with regard to the storage location.

17. The system of claim 16, further comprising program instructions executable by the one or more processors to:
allocate the allocated storage space on the virtual disk, wherein
the one or more production data files are accessible from a physical computing device executing the second application,
the first application is an application being executed in an application development and testing environment,
the second application is an application being executed in a production environment,
the input/output operation is generated by a virtual machine executed by a virtualization server,
the physical computing device and the virtualization server are separate from one another, and
the virtualization server and the storage system are communicatively coupled to one another.

18. The system of claim 17, further comprising program instructions executable by the one or more processors to:
receive an allocation map from the virtual machine, wherein
the allocation map comprises information regarding the allocated storage space,
the allocated storage space is allocated by the virtual machine, and
the allocated storage space corresponds, at least in part, to at least one of the one or more production data files;
convert information in the allocation map to one or more offsets associated with the one or more production data files, wherein
the one or more offsets are based on a storage structure of the one or more production data files; and overlay the storage structure over the allocation map, wherein
  the program instructions executable to facilitate serving of the data by permitting the storage system to re-map the input/output operation from the allocated storage space to the one or more production data files.

19. The system of claim 18, wherein
the program instructions executable by the one or more processors to overlay further facilitate the serving by permitting the virtual machine to access the one or more production data files by directing the read operation to the allocated storage space instead of the production data files.

20. The system of claim 17, further comprising program instructions executable by the one or more processors to:
  receive a request from the virtualization server to create the virtual storage unit; and
  based on receipt of the request,
    create the virtual storage unit in the storage system, wherein
      the virtual storage unit is used by the virtual machine to allocate the allocated storage space, and
      the virtual disk on the virtual storage unit is created as a sparse file.

21. The system of claim 17, further comprising program instructions executable by the one or more processors to:
  import the virtual disk from the storage system to the virtualization server, wherein
    the program instructions executable by the one or more processors to import are executed by a client,
    the client is a Network File System (NFS) client, and
    the virtual disk is imported to a hypervisor executed by the virtualization server; and
  export the virtual disk from the hypervisor to the virtual machine, wherein
    the exporting is performed by the hypervisor.

* * * * *